(12) United States Patent
Reynolds et al.

(10) Patent No.: US 7,585,404 B2
(45) Date of Patent: Sep. 8, 2009

(54) DECOMPOSITION OF WASTE PRODUCTS FORMED IN SLURRY CATALYST SYNTHESIS

(75) Inventors: Bruce E. Reynolds, Martinez, CA (US); Axel Brait, San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 259 days.

(21) Appl. No.: 11/567,543

(22) Filed: Dec. 6, 2006

(65) Prior Publication Data
US 2008/0139379 A1 Jun. 12, 2008

(51) Int. Cl.
*C10G 47/02* (2006.01)

(52) U.S. Cl. .................. 208/108; 208/213; 208/215; 502/3; 502/22; 502/159; 502/216; 502/219

(58) Field of Classification Search .......... None
See application file for complete search history.

(56) References Cited

U.S. PATENT DOCUMENTS

| | | | |
|---|---|---|---|
| 4,036,943 A | 7/1977 | Huron et al. |
| 4,434,141 A | 2/1984 | Hubred et al. |
| 4,554,138 A | 11/1985 | Marcantonio |
| 4,710,486 A | 12/1987 | Lopez |
| 4,885,080 A | 12/1989 | Brown et al. |
| 4,970,190 A | 11/1990 | Lopez |
| 5,053,376 A | 10/1991 | Bearden, Jr. et al. |
| 5,431,892 A | 7/1995 | Toyabe et al. |
| 2004/0081602 A1 | 4/2004 | Han et al. |
| 2006/0054533 A1 | 3/2006 | Chen |
| 2006/0054534 A1 | 3/2006 | Chen |
| 2006/0054535 A1 | 3/2006 | Chen |
| 2006/0058174 A1 | 3/2006 | Chen |
| 2006/0058175 A1 | 3/2006 | Chen |

OTHER PUBLICATIONS

Guichard, The Blue Oxide of Molybdenum, Compt. Rend., 1900; 131:389-392; abstract.

*Primary Examiner*—Melvin C Mayes
*Assistant Examiner*—Smita Patel

(57) ABSTRACT

This application discloses a process for decomposition of ammonium sulfates found in a stream comprising ammonium sulfate and slurry catalyst in oil. The ammonium sulfate is broken down into ammonia and hydrogen sulfide gas. These gases have many uses throughout the refinery, including the preparation of slurry hydroprocessing catalyst.

20 Claims, 2 Drawing Sheets

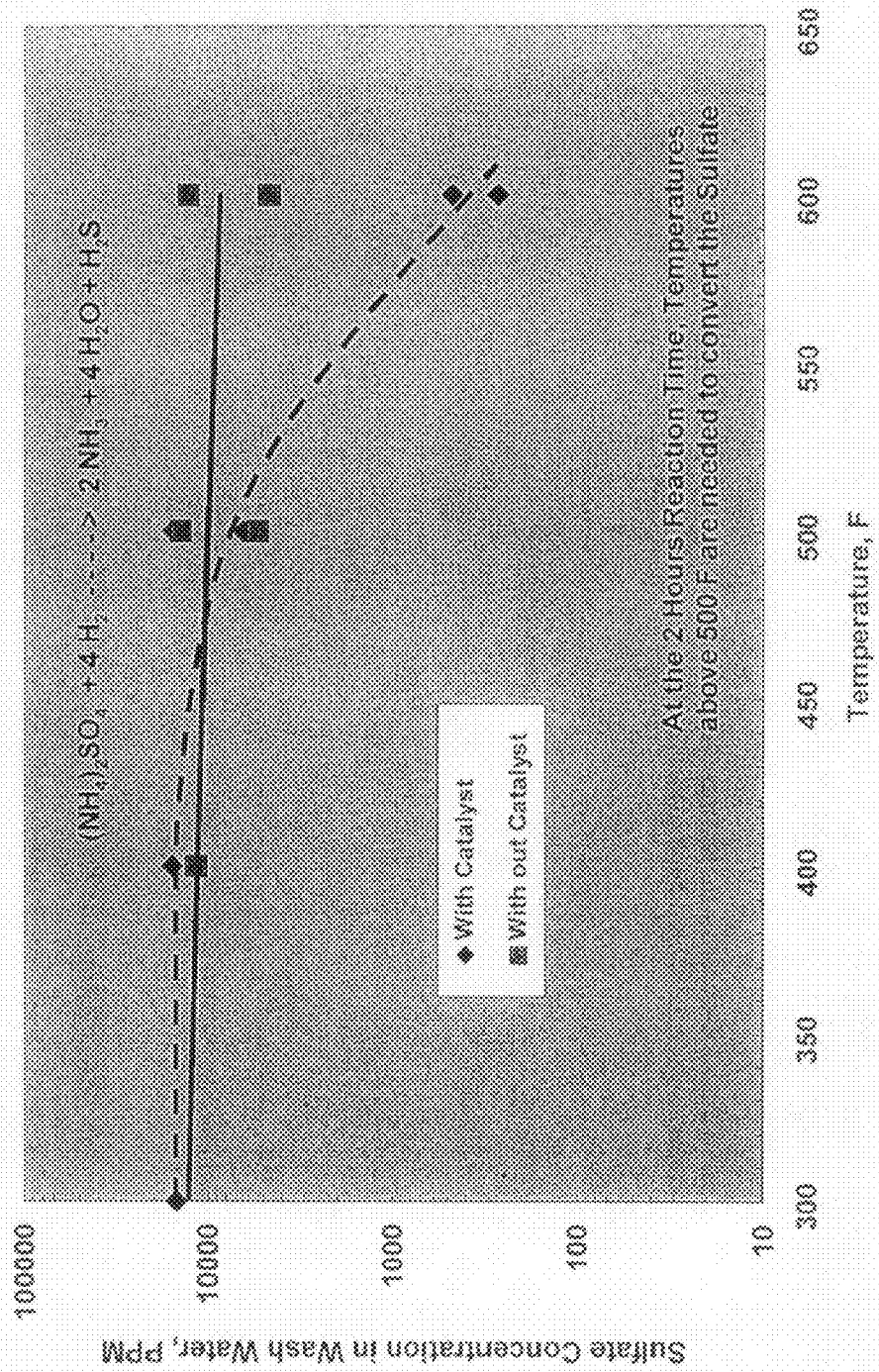

DECOMPOSITION OF WASTE PRODUCTS FORMED IN SLURRY CATALYST SYNTHESIS

FIELD OF THE INVENTION

This application discloses a process for decomposition of ammonium sulfate.

BACKGROUND OF THE INVENTION

Slurry catalyst compositions, means for their preparation and their use in hydroprocessing of heavy feeds are known in the refining arts. Some examples are discussed below:

U.S. Pat. No. 4,710,486 discloses a process for the preparation of a dispersed Group VIB metal sulfide hydrocarbon oil hydroprocessing catalyst. Process steps include reacting aqueous ammonia and a Group VIB metal compound, such as molybdenum oxide or tungsten oxide, to form a water soluble oxygen-containing compound such as ammonium molybdate or tungstate.

U.S. Pat. No. 4,970,190 discloses a process for the preparation of a dispersed Group VIB metal sulfide catalyst for use in hydrocarbon oil hydroprocessing. This catalyst is promoted with a Group VIII metal. Process steps include dissolving a Group VIB metal compound, such as molybdenum oxide or tungsten oxide, with ammonia to form a water soluble compound such as aqueous ammonium molybdate or ammonium tungstate.

U.S. Pat. No. 5,053,376 discloses a process for preparing a sulfided molybdenum catalyst concentrate. A precursor catalyst concentrate is formed by mixing together: (i) a hydrocarbonaceous oil comprising constituents boiling above about 1050 degree F.; (ii) a metal compound selected from the group consisting of Groups II, III, IV, V, VIB, VIIB, and VIII of the Periodic Table of the Elements, in an amount to provide from about 0.2 to 2 wt. % metal, based on the hydrocarbonaceous oil; and (iii) elemental sulfur in an amount such that the atomic ratio of sulfur to metal is from about 1/1 to 8/1 then (b) heating the mixture to an effective temperature to product a catalyst concentrate. Ammonium compounds may also be used in the preparation process.

In the preparation of slurry catalysts such as those discussed above, it is possible to produce ammonium sulfate as a waste product.

SUMMARY OF THE INVENTION

This application discloses a process for decomposing ammonium sulfate which may arise from different refinery sources. A major source is a waste stream from a metals recovery unit. This stream comprises water and ammonium sulfate. Another, less significant sources may be a stream comprising an active slurry catalyst which leaves a catalyst synthesis unit.

When ammonium sulfate is decomposed, streams of ammonia gas and hydrogen sulfide gas are produced. These streams have numerous uses in a refinery. They may be of particular use in catalyst in slurry hydroprocessing. A majority of the ammonia produced may be recycled back to the metals recovery unit, while most of the hydrogen sulfide may be recycled back to the catalyst synthesis unit. The decomposition process eliminates about one half of the ammonium sulfate waste product generated by a metal recovery unit and catalyst synthesis unit in series. Decomposition generally does not provide all of the ammonia and $H_2SO_4$ needed in the metals recovery unit and catalyst synthesis unit. Sulfur plants can at times be used to supply additional $H_2SO_4$ as needed.

The presence of ammonium sulfate can plug equipment, particularly the entrance to reactors such as the vacuum residuum hydroprocessing unit. This is an additional reason for ammonium sulfate removal.

The decomposition process also provides flexibility regarding where slurry hydroprocessing of heavy oils may be performed. Such processes often have metals recovery units following the hydroprocessing reactors. If the invention of this application is employed, the volume of ammonium sulfate to be eliminated is dramatically decreased. This provides greater flexibility in location of the metals recovery unit. All of these advantages result in more economical and environmentally friendly use of slurry catalyst in hydroprocessing.

The major steps of the decomposition process are as follows:

(a) passing a deoiled spent catalyst slurry to a metals recovery unit, where is combined with an ammonium leach solution, producing a stream comprising water and a ammonium sulfate, a stream comprising a compound composed of Group VIII metals and a stream comprising a compound composed of Group VIB metals;

(b) passing the streams comprising metal compounds to a catalyst synthesis unit, where they are combined with an oil, hydrogen sulfide gas, ammonia and a small amount of water to create an active slurry catalyst in oil, the oil comprising ammonium sulfate;

(c) passing the effluent of step (b) into a decomposition unit, where it is combined with the stream comprising water and ammonium sulfate from step (a);

(d) decomposing the ammonium sulfate in the combined streams of step (c) into hydrogen sulfide and ammonia, streams which are removed from the decomposition unit;

(e) passing the active slurry catalyst in oil from the decomposition unit to storage or to a hydroprocessing unit.

BRIEF DESCRIPTION OF THE FIGURES

FIG. 2 is a graph showing the relative amount of decomposition of ammonium sulfate occurring in presence v. absence of slurry catalyst.

DETAILED DESCRIPTION OF THE INVENTION

Figure 1:
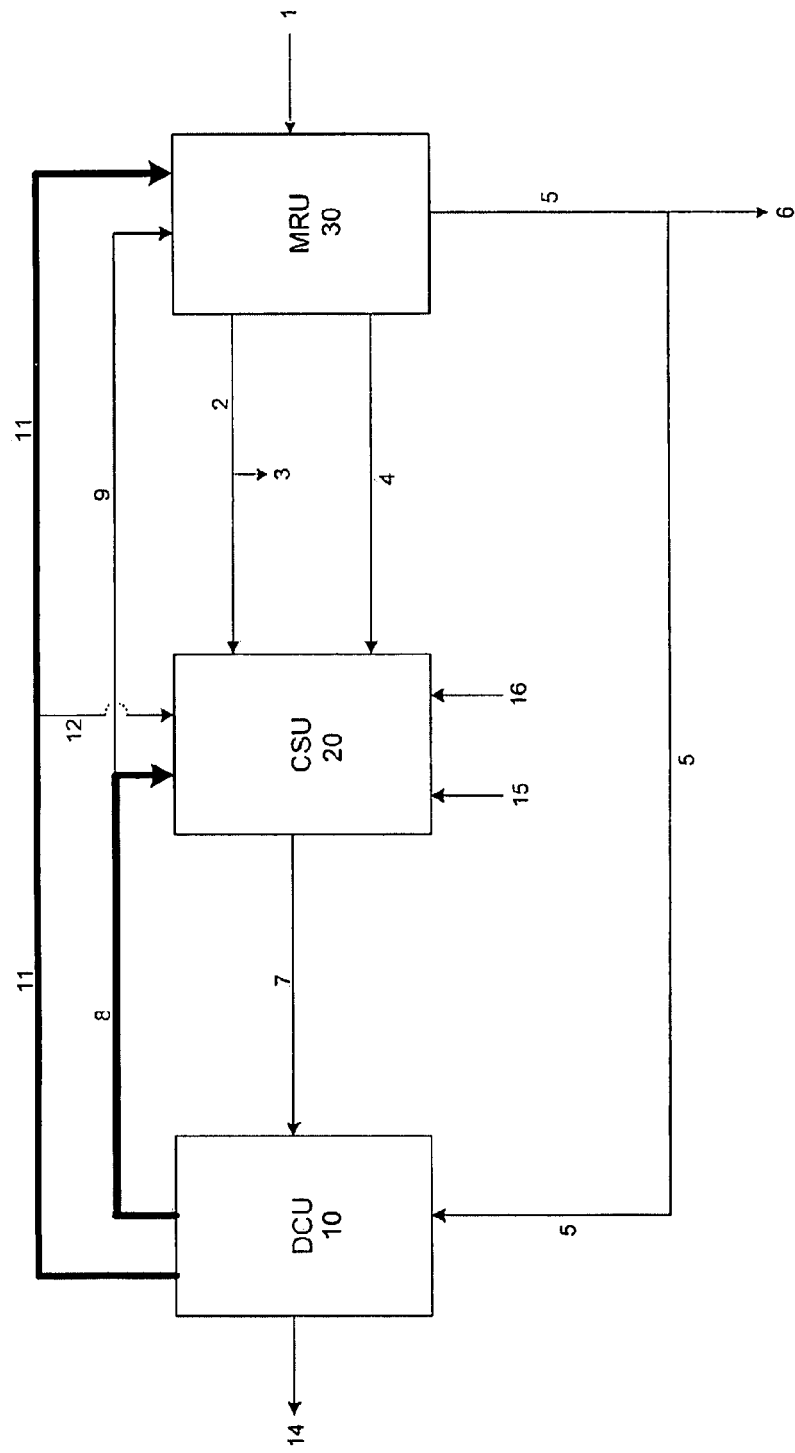
FIG. 1 illustrates the process disclosed in this invention for decomposing ammonium sulfate waste products resulting from a metals recovery unit and catalyst synthesis unit in series.

A deoiled spent slurry catalyst enters the metals recovery unit (MRU 30) and is dissolved in an aqueous ammonium leach solution (stream 11). The spent slurry catalyst had been employed in hydroprocessing. Through a series of solvent extractions and crystallization steps the Group VIII and Group VI metals from the spent catalyst are recovered, along with a byproduct of ammonium sulfate (stream 5). The Group VIII metal is preferably nickel. Nickel is recovered as a nickel sulfate stream (stream 2) and is passed to the catalyst synthesis unit (CSU 20). A portion of the nickel sulfate stream (stream 3) can be diverted to control the amount of nickel entering the catalyst synthesis unit (CSU 20). Recovered Group VI metals, such as molybdenum, exit the MRU in stream 4. If the metal is molybdenum, it is recovered as an ammonium dimolybdate stream (stream 4) which is passed to the catalyst synthesis unit (CSU 20). A light hydrocarbon or VGO (vacuum gas oil) (stream 15) enters into the catalyst synthesis unit (CSU 20) along with a small amount of water (stream 16). Hydrogen sulfide (stream 8) along with a small amount of ammonia gas (stream 12) is passed to the catalyst synthesis unit (CSU 20).

In the catalyst synthesis unit (CSU 20), conditions include a temperature in the range from 80° F., preferably in the range from 100° F. to 180° F., and most preferably in the range from 130° F. to 160° F. Pressure is in the range from 100 to 3000 psig, preferably in the range from 200 to 1000 psig, and most preferably from 300 to 500 psig.

The ingredients are combined in the CSU 20 to form an active slurry catalyst in oil. A small amount of ammonium sulfate formed from the nickel sulfate and ammonia gas added to the CSU 20 is also present in this stream. The small stream of water (stream 16) acts to keep the small amount of ammonium sulfate in solution. This minimizes precipitation in equipment. The active slurry catalyst in oil (stream 7) enters into a decomposition unit (DCU 10) for removal ammonium sulfate.

The process conditions of the decomposition unit (DCU 10) include temperature ranges from about 400° F. to about 1000° F., preferably from about 500° to about 800° F., and most preferably from about 600° F. to about 700° F. Pressure ranges from about 100 to about 3000 psi, preferably from 300 to about 2500 psi and more preferably from about 500 to about 2000 psi. Hydrogen flow rate is in the range from about 2500 to about 7500 scf/bbl, and preferably from about 5000 to about 6000 scf/bbl.

Decomposition of ammonium sulfate into hydrogen sulfide and ammonia requires about 2 hours. Residence time in the decomposition unit for the mixture comprising oil, slurry and ammonium sulfate is from 1.5 to three hours, preferably about 2 hours.

The amount of ammonia added is based on the ratio of $NH_3$ to Group VI B metal oxide in lbs/lbs and generally ranges from 0.1 lbs/lbs to about 1.0 lbs/lbs, preferably from about 0.15 lbs/lbs to about 0.50 lbs/lbs, and most preferably from about 0.2 lbs/lbs to about 0.30 lbs/lbs.

For every mole of hydrogen sulfide gas produced in the decomposition unit, 2 moles of ammonia are produced.

The DCU 10 is a continuously stirred tank reactor (CSTR or alternately, perfectly mixed reactor). This type of reactor is employed in order to prevent catalyst agglomeration.

The ammonium sulfate enters the DCU 10 in two streams. Stream 7 comes from the CSU 20, but most of the ammonium sulfate comes from the MRU 30 through stream 5. In the DCU 10, ammonium sulfate thermally decomposes to ammonia gas and hydrogen sulfide gas. Most of the ammonia (stream 11) feeds back to the MRU 30 unit with a small bleed stream (stream 12) feeding back to the CSU 20 unit for conversion of excess nickel sulfate to ammonium sulfate. The hydrogen sulfide stream (stream 8) feeds to the catalyst synthesis unit (CSU 20) with a small portion (stream 9) going back to the MRU 30 unit. Steam 6 is a bleed stream of ammonium sulfate to control the amount of ammonia being produced by the overall system. Stream 14 is the active slurry catalyst mixed with VGO or a light hydrocarbon.

EXAMPLE

FIG. 2 is a graph of sulfate concentration in wash water v. temperature for two mixtures. One mixture is a solution of ammonium sulfate alone. The other mixture is an ammonium sulfate solution combined with a slurry catalyst comprising molybdenum and nickel, prepared in the catalyst synthesis unit. The ammonium sulfate admixed with the catalyst begins to decompose into hydrogen sulfide and ammonia at about 500 F., following a two hour residence time. This apparent from the dramatic decrease in the sulfate concentration in wash water at 500 F. There is no apparent decomposition in the solution containing only ammonium sulfate at the same conditions. FIG. 2 demonstrates the criticality of the presence of slurry catalyst as prepared in the catalyst synthesis unit.

What is claimed is:

1. A process for the collection and decomposition of ammonium sulfate, said process comprising the following steps:
    (a) passing a deoiled spent catalyst slurry to a metals recovery unit, where is combined with an ammonium leach solution, producing a stream comprising water and a ammonium sulfate, a stream comprising a compound composed of Group VIII metals and a stream comprising a compound composed of Group VIB metals;
    (b) passing the streams comprising metal compounds to a catalyst synthesis unit, where they are combined with an oil, hydrogen sulfide gas, ammonia and a small amount of water to create an active slurry catalyst in oil, the active slurry catalyst in oil comprising ammonium sulfate;
    (c) passing the active slurry catalyst in oil into a decomposition unit, where it is combined with the stream comprising water and ammonium sulfate from step (a);
    (d) decomposing the ammonium sulfate in the combined streams of step (c) into hydrogen sulfide gas and ammonia streams which are removed from the decomposition unit; and
    (e) passing the active slurry catalyst in oil from the decomposition unit to storage or to a hydroprocessing unit.

2. The process of claim 1, wherein the deoiled spent catalyst slurry is subjected to a series of solvent extractions and crystallization steps in step (a) in order to recover ammonium sulfate as well as compounds comprising Group VIII and Group VIB metals.

3. The process of claim 2, wherein the Group VIII metals is nickel and the Group VIB metal is molybdenum.

4. The process of claim 2, wherein the Group VIII metal compound is nickel sulfate and the Group VIB metal compound is ammonium dimolybdate.

5. The process of claim 1, wherein the oil of step (b) comprises a light hydrocarbon or vacuum gas oil.

6. The process of claim 1, wherein conditions in the catalyst synthesis unit comprise a temperature in the range from 80° F. to 200° F.

7. The process of claim 1, wherein conditions in the catalyst synthesis unit comprise a pressure in the range from 100 to 3000 psig.

8. The process of claim 1, in which a small stream of water is added to the catalyst synthesis unit in order to prevent agglomeration of ammonium sulfate.

9. The process of claim 1, wherein conditions in the decomposition unit comprise a temperature in the range from about 400° F. to about 1000° F.

10. The process of claim 1, wherein conditions in the decomposition unit comprise a pressure in the range from about 100 to about 3000 psi.

11. The process of claim 1, wherein the hydrogen flow rate in the decomposition unit is in the range from 2500 to 7500 scf/bbl.

12. The process of claim 1, in which the residence time in the decomposition unit is from 1.5 to three hours.

13. The process of claim 1, in which the decomposition unit is a constant stirred tank reactor.

14. The process of claim 1, wherein the ammonium sulfate enters the decomposition unit in two streams, one from the catalyst synthesis unit and one from the metals recovery unit.

15. The process of claim 14, wherein the volume of ammonium sulfate entering the decomposition unit from the metals recovery unit is greater than the volume entering from the catalyst synthesis unit.

16. The process of claim 1, wherein 2 moles of ammonia are produced in the decomposition unit for every mole of hydrogen sulfide produced.

17. The process of claim 1, wherein ammonia from the decomposition unit is recycled to the metals recovery unit and to the catalyst synthesis unit.

18. The process of claim 1, wherein hydrogen sulfide from the decomposition unit is recycled to the metals recovery unit and the catalyst synthesis unit.

19. The process of claim 18, where the volume of ammonia recycled to the metals recovery unit is greater than the volume of ammonia recycled to the catalyst synthesis unit.

20. The process of claim 19, wherein the volume of hydrogen sulfide recycled to the catalyst synthesis unit is greater than the volume of hydrogen sulfide recycled to the metals recovery unit.

* * * * *